Nov. 1, 1927.
W. G. HALL
1,647,516
MACERATION DISTRIBUTOR FOR SUGAR CANE MILLS
Filed May 14, 1924
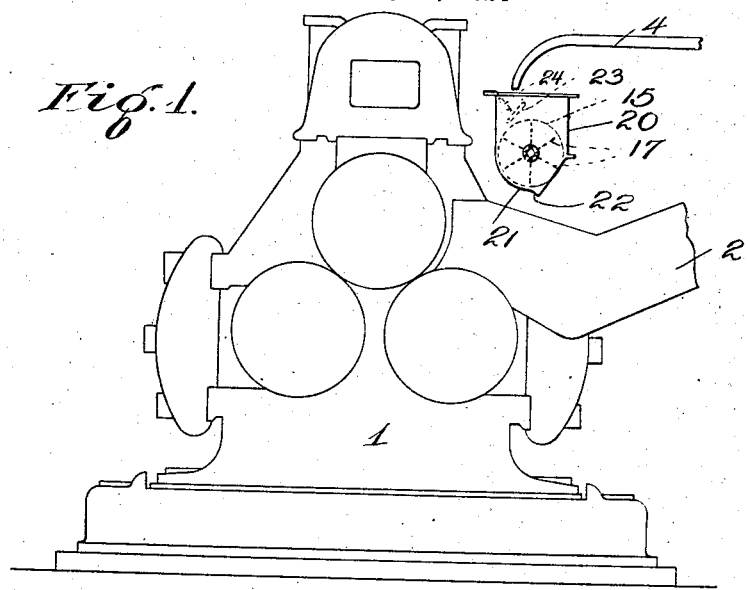
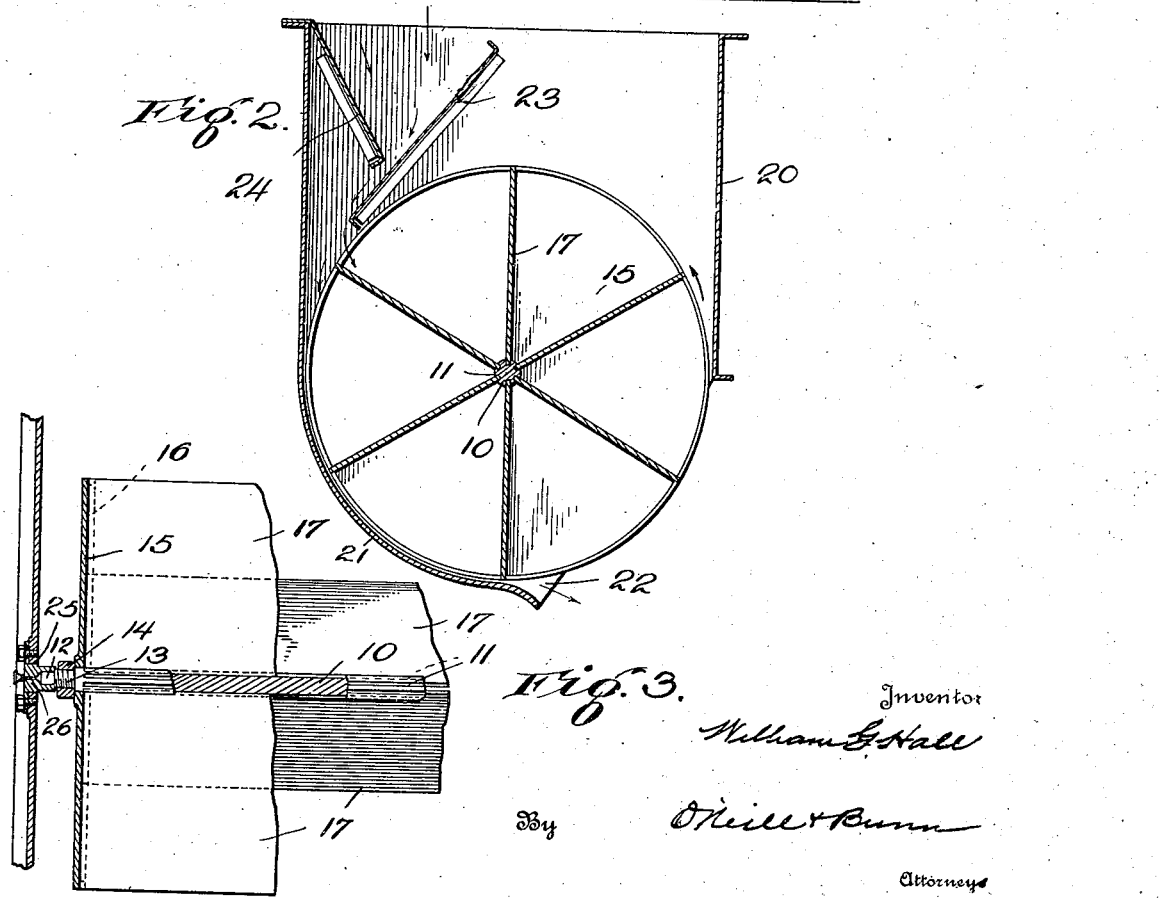
Inventor
William G. Hall
By O'Neill & Bunn
Attorneys Patented Nov. 1, 1927.

1,647,516

UNITED STATES PATENT OFFICE.

WILLIAM G. HALL, OF HONOLULU, TERRITORY OF HAWAII.

MACERATION DISTRIBUTOR FOR SUGAR-CANE MILLS.

Application filed May 14, 1924. Serial No. 713,204.

The invention relates to certain new and useful improvements in maceration distributors for sugar cane mills of the general type shown in my prior Patent No. 1,461,272, dated July 10, 1923, and has for its object to provide a distributor of the character indicated having an adequate capacity to handle all of the maceration material and being so constructed as to provide for a substantially continuous and uniform distribution of the maceration material to the bagasse. To these ends, the invention comprises a rotary cylinder or drum, preferably formed of a shaft having disk-like end walls secured to the ends of the shaft and radial webs extending from said shaft and between the end walls, said webs constituting longitudinal V-shaped pockets. The drum is rotatably mounted in a casing having a curved bottom section closely conforming to the contour of the drum, said bottom being cut away at one side for its entire length to afford a discharge opening with a downwardly curved lip, the maceration liquid being supplied by piping into the open top of the casing and onto longitudinal deflector plates which deliver the liquid to pockets successively, in a plane displaced rearwardly of the axis of the drum, so that the impact of the liquid on the radial webs and the weight of the accumulated liquid in the pockets will rotate the drum after the manner of an overshot water wheel and the liquid will be discharged continuously from the casing, over the curved lip of the bottom section, in a substantially continuous uniform flow onto the bagasse, thereby avoiding the alternate surging and cessation or interruption of the maceration liquid, resulting in irregular saturation of the bagasse which is one inherent objection in distributors heretofore employed.

The invention is illustrated in the accompanying drawings, in which:

Fig. 1 is a diagrammatic view of a three roll sugar cane mill showing the improved distributor applied thereto.

Fig. 2 is a transverse vertical section through the distributor.

Fig. 3 is a partially longitudinal vertical section through the distributor.

Referring to the drawings, 1 indicates a typical three roll sugar cane mill, the bagasse being delivered by the mill in a suitable conveyor 2. The maceration distributor is mounted above and transversely of the conveyor 2 for the purpose of distributing the maceration liquid over the blanket of the bagasse on the conveyor 2, as will be understood by those skilled in the art.

It is highly desirable that the distribution of the maceration fluid be substantially uniform and continuous if the extraction of the sugar juices from the crushed cane and the bagasse is to be thorough and complete. The instant invention, as hereinbefore indicated, provides a distributor designed to effect this desirable object and comprises a rotary cylinder or drum-like element mounted above and transversely of the conveyor 2 and provided with a series of longitudinal V-shaped pockets, of ample capacity to receive all of the maceration fluid delivered by a pipe or suitable conduit 4.

In the practical exemplification of the distributor drum, the same comprises a supporting shaft 10 having a series of longitudinal grooves 11 therein to receive the inner longitudinal edges of a corresponding number of plate-like vanes 17 disposed in radial order about the shaft and confined between end plates or walls 15 of circular or disk form, provided with radial slots 16 to receive the vertical edges of the webs 17, said end plates being held in position on the shaft by nuts 14 engaging a screw threaded portion of the shaft 13, the extreme ends of the shafts being turned down to form journals 12 on which the drum rotates.

The drum is enclosed in a generally rectangular casing 20 having an open top and provided with a bottom section 21 conforming to the cylindrical contour of the drum and extending around and in close proximity to a little more than the rear quarter section of the drum, said bottom section terminating in a downwardly curved lip 22, which preferably extends a short distance beyond the median plane of the casing and drum and throughout the length of the casing, as illustrated in Fig. 2, the forward lower section of the casing being cut away. The ends 12 of the shaft engage removable bushings 25 which are secured to the side walls of the casing 20 and constitute the journal bearings of the drum.

Extending longitudinally of the casing 20 above the drum are two oppositely inclined deflector plates 23 and 24, which, in effect, constitute a V-shaped trough with an open bottom which receives the maceration liquid from a supply pipe 4 mounted above the casing, and delivers the liquid into the pockets of the drums successively, as the latter pass under the lower lip of the plate 23, the impact of the falling liquid and the weight of the accumulated liquid in the pockets serving to rotate the drum after the manner of an overshot water wheel, thereby avoiding the necessity of providing separate driving means for operating the distributor.

As indicated, the maceration liquid, preferably unstrained juice from the pan of a succeeding mill of the series, is delivered by a supply pipe 4 into the top of the casing 20 and onto the deflector plates 23 and 24, which, because of their trough-like arrangement, distributes the liquid throughout the longitudinal extent of the trough and delivers the liquid to the immediate subjacent V-shaped pocket of the drum. The impact of the falling liquid on the vanes 17 of the drum and the weight of the accumulated liquid in the pockets will cause the drum to rotate in a direction to bring the pockets successively towards the discharge lip 22 in the bottom of the casing. Inasmuch as the curved bottom section 21 of the casing is in close proximity to the periphery of the drum, the liquid in the pockets will escape therefrom in a substantially uniform sheet and in a practically continuous regular flow, and is delivered over the discharge lip 22 of the bottom onto the bagasse continuously and uniformly, so that the bagasse will be uniformly impregnated or saturated with the macerating liquid.

It will be understood, of course, that the distributor may be supported by any suitable means in proper relative position above the end of the conveyor, which receives the cane from one mill and delivers it to the next mill in the series. In the preferred arrangement, a distributor is mounted above the intake end of the conveyor connecting the first and second mill and the conveyor connecting the second and third mill of an ordinary twelve roll installation. The distributor is particularly adapted to the distribution of maceration in the form of unstrained juice, which contains a relatively large amount of cush-cush, which may be delivered from the pans directly to a suitable force pump which discharges the unstrained juice through pipes, such as 4, directly to the distributors, which latter, because of their particular construction and arrangement, insure the delivery of the macerating juice in a substantially continuous and uniform flow onto the mattresses of bagasse carried by the respective conveyors, so that the entire mass of the bagasse is thoroughly and evenly impregnated with the maceration juices and a maximum extraction of the residual juices in the bagasse is effected.

What I claim is:

1. A maceration distributor comprising a rotary drum provided with a series of longitudinal troughs defined by end walls and substantially radial webs between said walls, a casing in which the drum is journaled, said casing having a bottom section conforming to and in close proximity to the periphery of the drum and terminating in a discharge opening longitudinally of the bottom, and means to direct the maceration fluid against the radial webs to effect rotation of the drum; whereby a substantially continuous and uniform flow of the maceration onto the bagasse is effected.

2. A maceration distributor comprising an axial shaft, disk-like end walls spaced on said shaft, radial webs extending from said shaft and between said walls, a casing in which the shaft is journaled for rotation on a horizontal axis said casing having a bottom section conforming to and in proximity to the rear quarter of the periphery of the rotary member and having a downwardly deflected discharge lip extending longitudinally of the casing.

3. A maceration distributor comprising a rotary drum provided with a series of longitudinal troughs defined by end walls and substantially radial webs between said walls, a casing in which the drum is journaled for rotation on a horizontal axis said casing having a bottom section conforming to and in proximity to the rear quarter of the periphery of the drum, the forward section of the bottom being cut away to provide a longitudinal discharge opening, and a trough-like receptacle mounted in said casing above the drum and to one side of the vertical axis of the latter to receive the maceration liquid and deliver the same to the successive troughs of the drum and effect rotation of said drum.

4. A maceration distributor comprising a series of V-shaped troughs closed at their ends and disposed in annular arrangement about a longitudinal shaft, a casing in which the shaft is journaled on a horizontal axis, said casing having a curved bottom section conforming to and in proximity to the peripheral edges of the annular series of troughs and terminating in a discharge lip extending longitudinally of the casing, the bottom of the casing beyond the lip being cut away, and a deflector device mounted longitudinally in the upper part of the casing and to the rear of the vertical plane through the axis of the rotary shaft to deliver the maceration liquid into the successive troughs and effect rotation of the troughs and their supporting shaft within the casing.

In testimony whereof I affix my signature.

WILLIAM G. HALL.